INVENTORS
F. F. WHITE,
N. J. TANNO &
E. T. CHIPPS
BY McCoy, Greene & Howell
ATTORNEYS

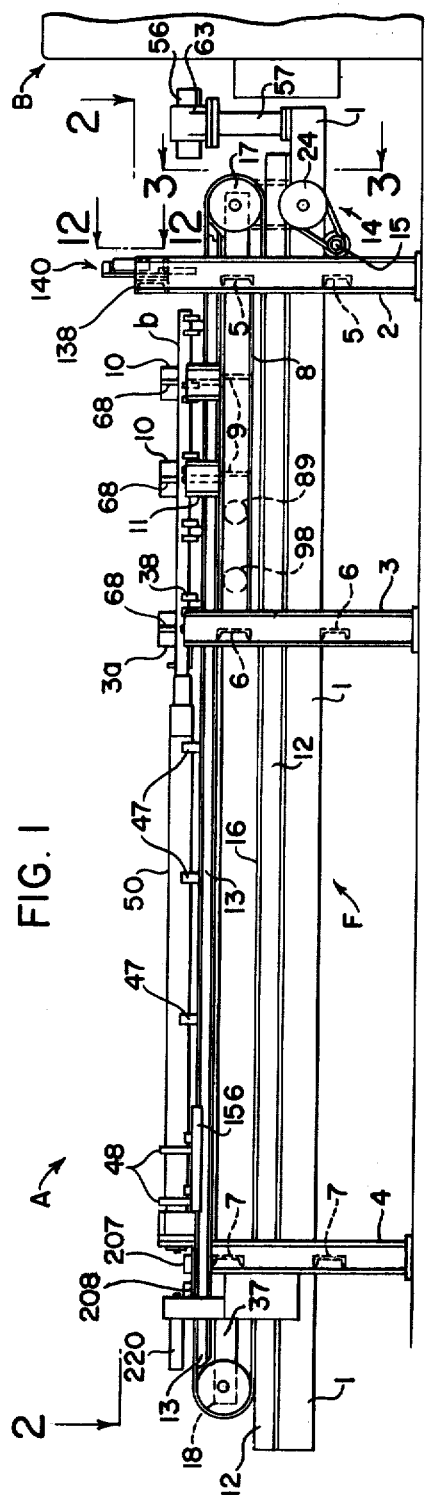

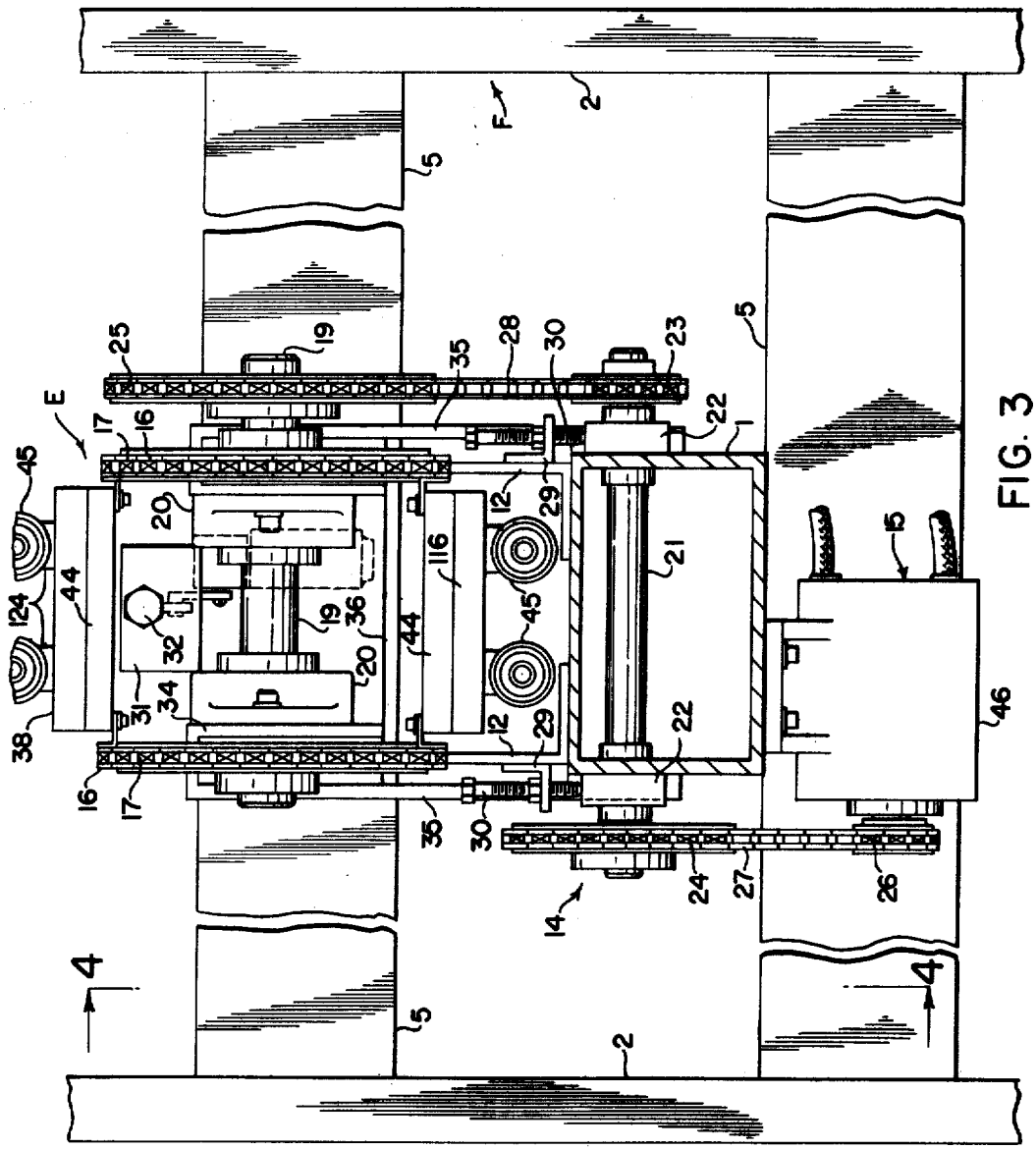

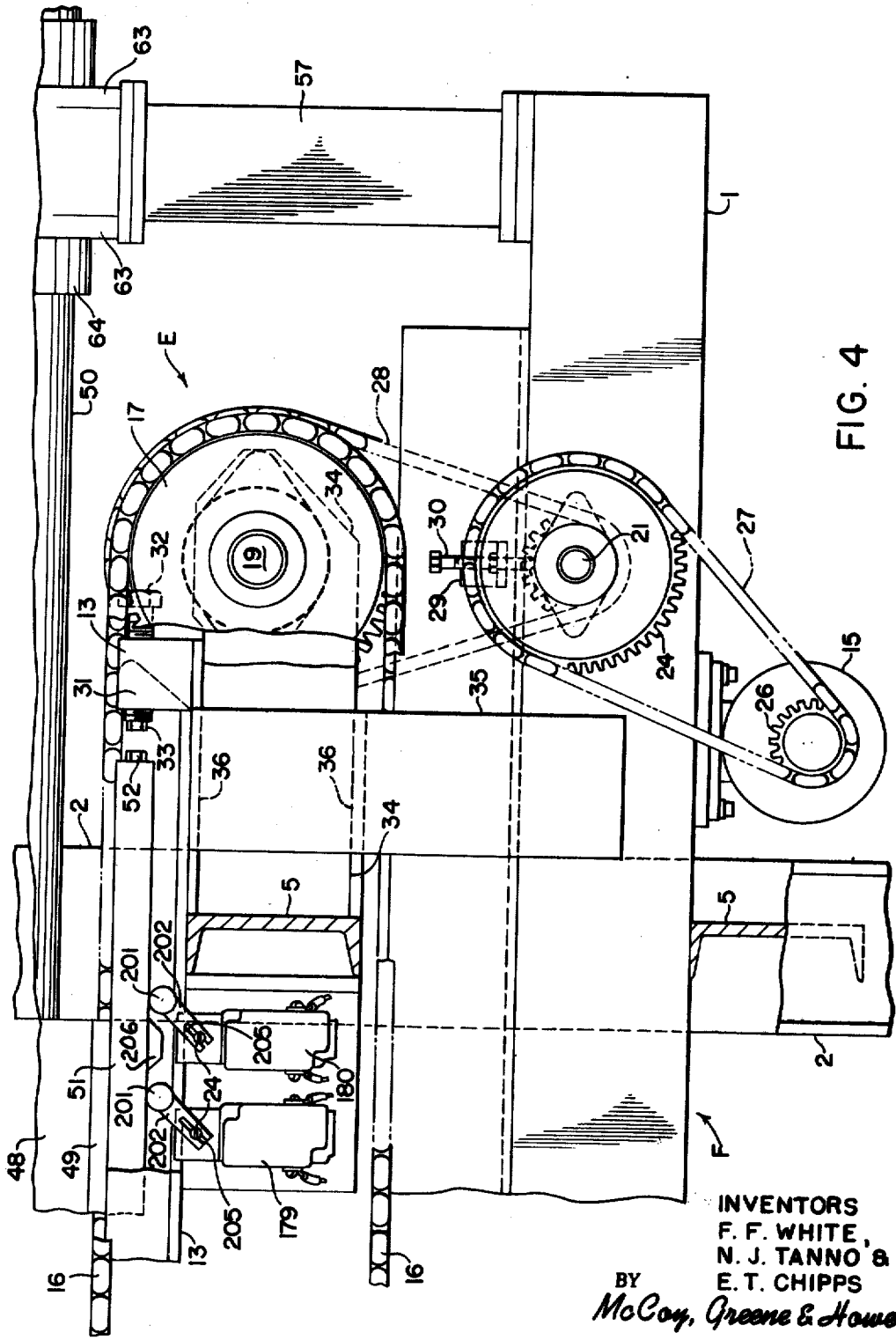

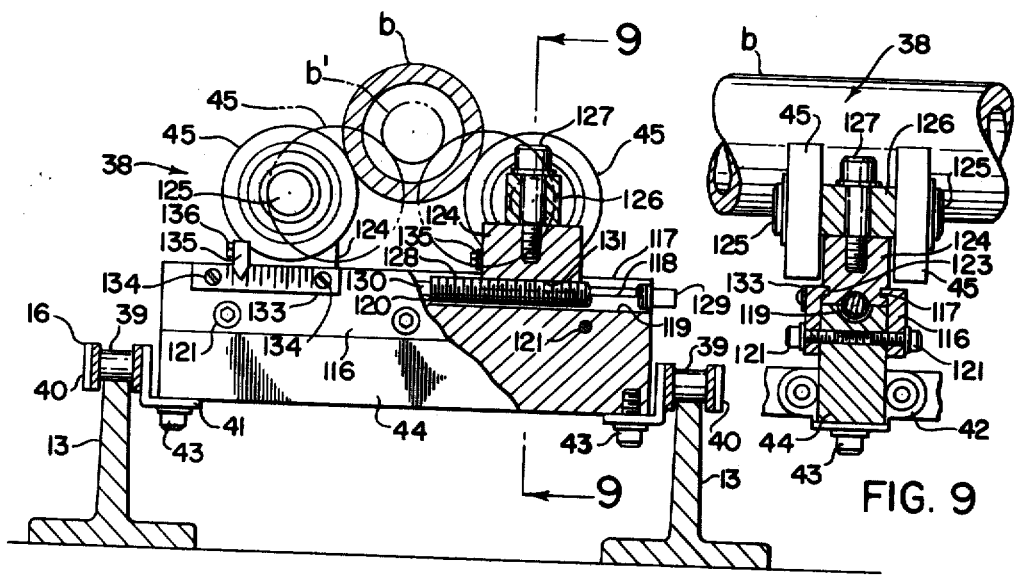
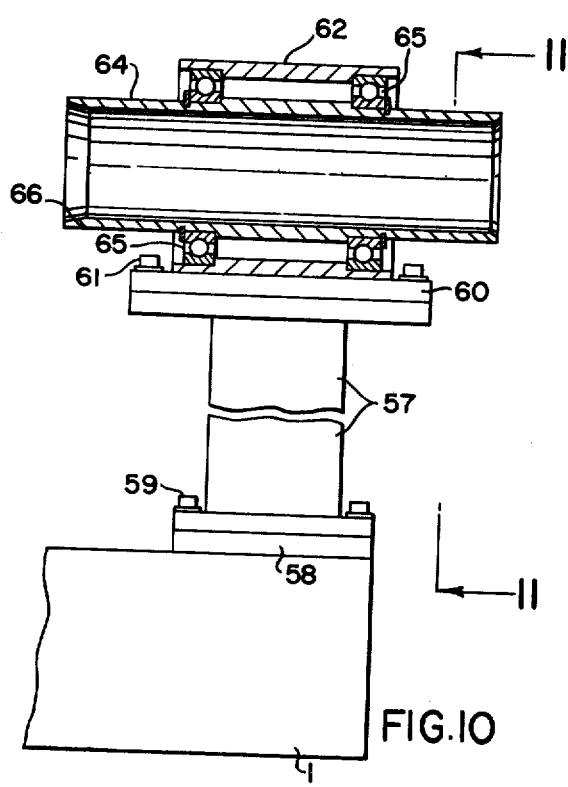
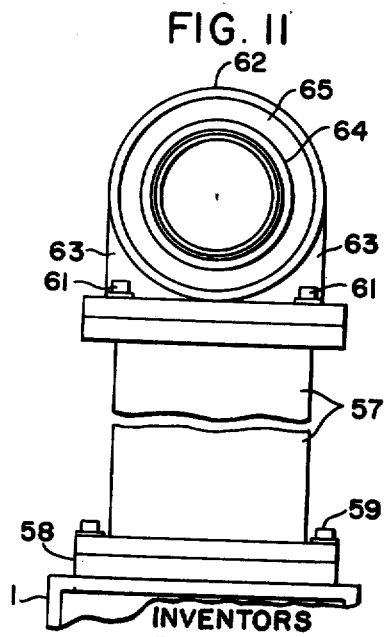

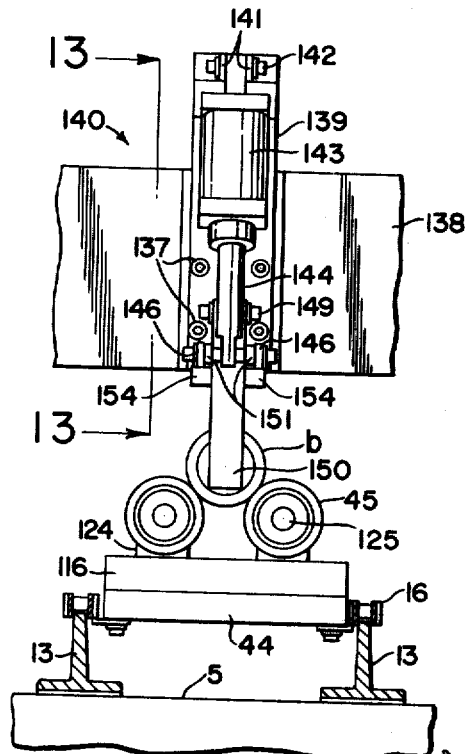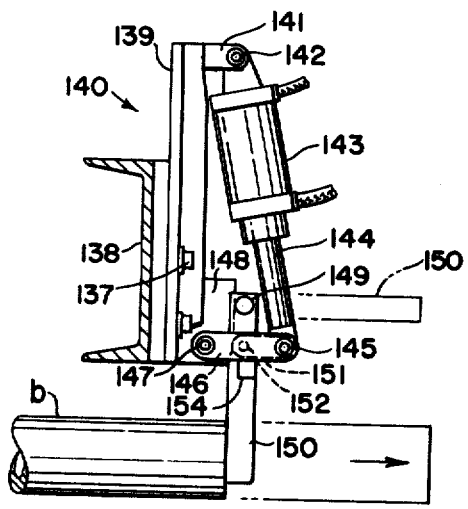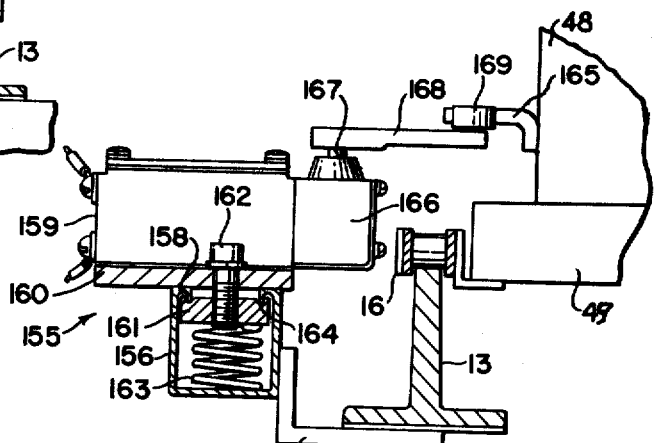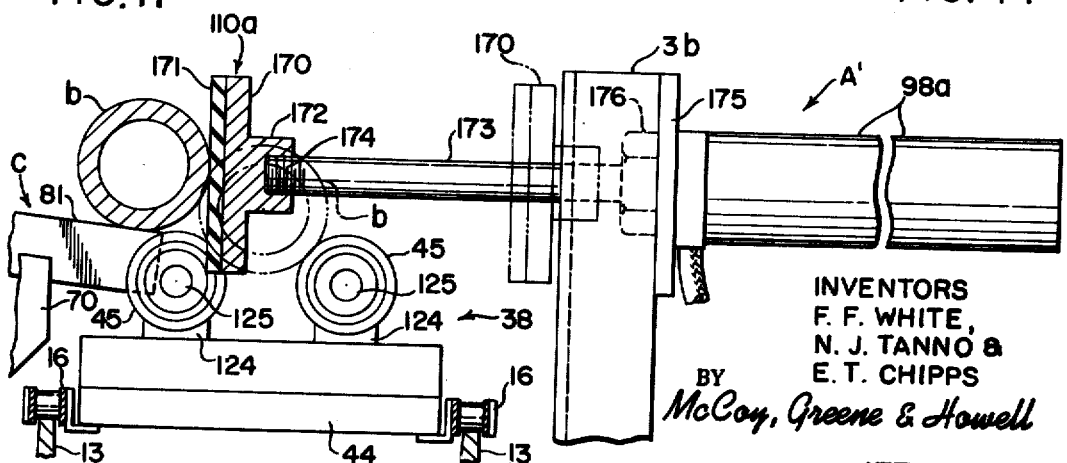

INVENTOR
F. F. WHITE
N. J. TANNO &
E. T. CHIPPS
BY McCoy, Greene & Howell
ATTORNEYS United States Patent Office 3,493,125
Patented Feb. 3, 1970

3,493,125
FEEDING APPARATUS FOR HEAVY
BARS AND TUBES
Frank F. White, Shaker Heights, Norman J. Tanno, Kirtland, and Elmer T. Chipps, Mentor-on-the-Lake, Ohio, assignors to Automation Development Corporation, Mentor, Ohio, a corporation of Ohio
Filed Apr. 26, 1967, Ser. No. 633,868
Int. Cl. B65g 17/00, 47/74
U.S. Cl. 214—1.2
16 Claims

ABSTRACT OF THE DISCLOSURE

An automatic bar feeder having a feed rack and an escapement mechanism to feed bars individually to roller-type carriers of a chain conveyor, retractable ramp members movable into the path of movement of the carriers to support a bar as it rolls laterally from the feed rack to a loading position above the carriers, and means engageable with the bar at said loading position to reduce its speed and the force of impact of the bar on the carriers. The latter means is preferably actuated by a pneumatic cylinder and may take the form of a cushioning pad. Such means may also serve as an ejecting means to move each bar from the carriers to an unloading ramp. The novel construction of the feeder also makes it possible to handle bars of different sizes and to maintain close tolerances when positioning the bar in the collet of the lathe or other machine to which it is fed, thereby eliminating the need for a stock stop in such machine.

---

The present invention relates to automatic or semi-automatic feeding apparatus for bars and tubes, and more particularly to an improved feeder for handling heavy bars and tubes of different diameters having a novel frame structure, improved means for loading and unloading the conveyor, and means to prevent damage when each bar is lowered into the carriers of the conveyor.

This invention makes it possible to provide automatic or semi-automatic loading and feeding of heavy metal bars or tubes of different sizes with relatively inexpensive equipment and without serious damage when each bar is dropped onto the carriers of the conveyor. Ramp means are provided at the discharge end of the feed rack at one side of the conveyor to move into and out of the path of movement of the bar-receiving carriers of the conveyor. Such means serve to support the bar at a loading position above and near the carriers. Means are provided to engage the bar as it rolls to such loading position, to resist such rolling movement and to reduce the force of impact as the heavy bar drops onto the carriers of the conveyor. Such means is preferably moved to its operative position by an air cylinder or the like from a retracted position out of the path of movement of said carriers.

Where unloading means are provided opposite the feed rack, such means may be associated with the ejector means. For example, ejector fingers may be provided to lift the bar off the carriers onto the unloading ramp at the end of the cycle and also to stop rolling of the bar at its loading position above the carriers at the beginning of such cycle.

In a modified form of the invention, such means comprises a cushioning pad and an air cylinder for moving the pad laterally to a position to engage the side of a bar in its loading position. Such pad may be retracted at a slow speed to gently lower the bar onto the carriers of the conveyor.

The feeder of this invention preferably has an elongated pusher mounted on the conveyor with feed fingers or the like for gripping the end of the bar, a retractable stop means for accurately positioning the bar relative to the pusher, and adjustable stop means for accurately locating the pusher in a predetermined fully advanced position, whereby the bar may be accurately positioned in the collet of the machine without requiring a conventional stock stop on such machine.

The feeder of this invention is particularly advantageous because it may easily be adjusted to handle bars and tubes of many different diameters. The carriers on the conveyor for supporting the bar are provided with laterally spaced rollers whose positions may readily be adjusted laterally in accordance with the diameter of the bars on the feed rack. A single adjusting screw is provided on each of the carriers, and a pair of supporting blocks are provided for supporting the rollers, such blocks moving equal distances in opposite directions in response to rotation of said screw, whereby the rollers are simultaneously adjusted in opposite directions.

The frame used on the machine of this invention employs an unusual type of beam and has unique construction ideal for a bar and tube feeder because of its exceptional strength and rigidity, its low cost of manufacture and its versatility. The box beam provides a backbone for the frame which maintains the parts in proper alignment, reduces the number of legs required for proper support, and eliminates the need for expensive castings or expensive welding operations.

An object of the present invention is to provide a simple, inexpensive bar feeder capable of handling heavy cylindrical bars and tubes of varying sizes.

A further object of the invention is to provide means for feeding heavy bars or tubes from a feed rack to carriers on a conveyor without damaging the carriers.

Another object of the invention is to provide a bar feeder which may readily be adjusted to handle bars and tubes of greatly varying sizes.

Another object is to provide a bar feeder capable of feeding a heavy bar or tube axially to a position spaced a great distance from the front end of the feeder frame.

Another object is to provide a bar feeder which can position a bar or tube accurately in a lathe, screw machine or other machine without the assistance of a stock stop on such machine.

Another object is to provide a bar feeder having improved means for loading and unloading bars and tubes.

These and other objects, uses and advantages of the present invention will become apparent to those skilled in the art from the following description and claims and from the drawings in which:

FIGURE 1 is a side elevational view on a reduced scale showing a bar and tube feeding apparatus constructed according to the present invention;

FIGURE 2 is a top plan view of the apparatus of FIGURE 1 with parts omitted looking in the direction of the arrows 2—2 of FIGURE 1;

FIGURE 3 is a transverse vertical sectional view taken on the line 3—3 of FIGURE 1 and a larger scale;

FIGURE 4 is a fragmentary vertical sectional view taken on the line 4—4 of FIGURE 3 and on the same scale;

FIGURE 8 is a fragmentary transverse vertical sectional view taken on the line 8—8 of FIGURE 6 with parts broken away and shown in section, an adjusted position of each roller being shown in dot-dash lines;

FIGURE 9 is a longitudinal vertical sectional view taken on the line 9—9 of FIGURE 8;

FIGURE 10 is a fragmentary longitudinal vertical sectional view taken on the line 10—10 of FIGURE 2 and on a larger scale;

FIGURE 11 is a transverse vertical sectional view taken on the line 11—11 of FIGURE 10;

FIGURE 12 is a fragmentary transverse vertical sectional view taken on the line 12—12 of FIGURE 1 and on a larger scale;

FIGURE 13 is a fragmentary vertical sectional view taken on the line 13—13 of FIGURE 12, the stop member being shown in dot-dash lines in its retracted position;

FIGURE 14 is a fragmentary transverse vertical sectional view taken on the line 14—14 of FIGURE 1 and on a larger scale;

FIGURE 17 is a fragmentary transverse vertical sectional view showing a bar and tube feeder similar to the feeder of FIGURES 1 to 14 but having a different means for lowering each bar onto the carriers of the conveyor, the bar and cushioning pad being shown in dot-dash lines in their positions when the pad is retracted.

Figure 5:
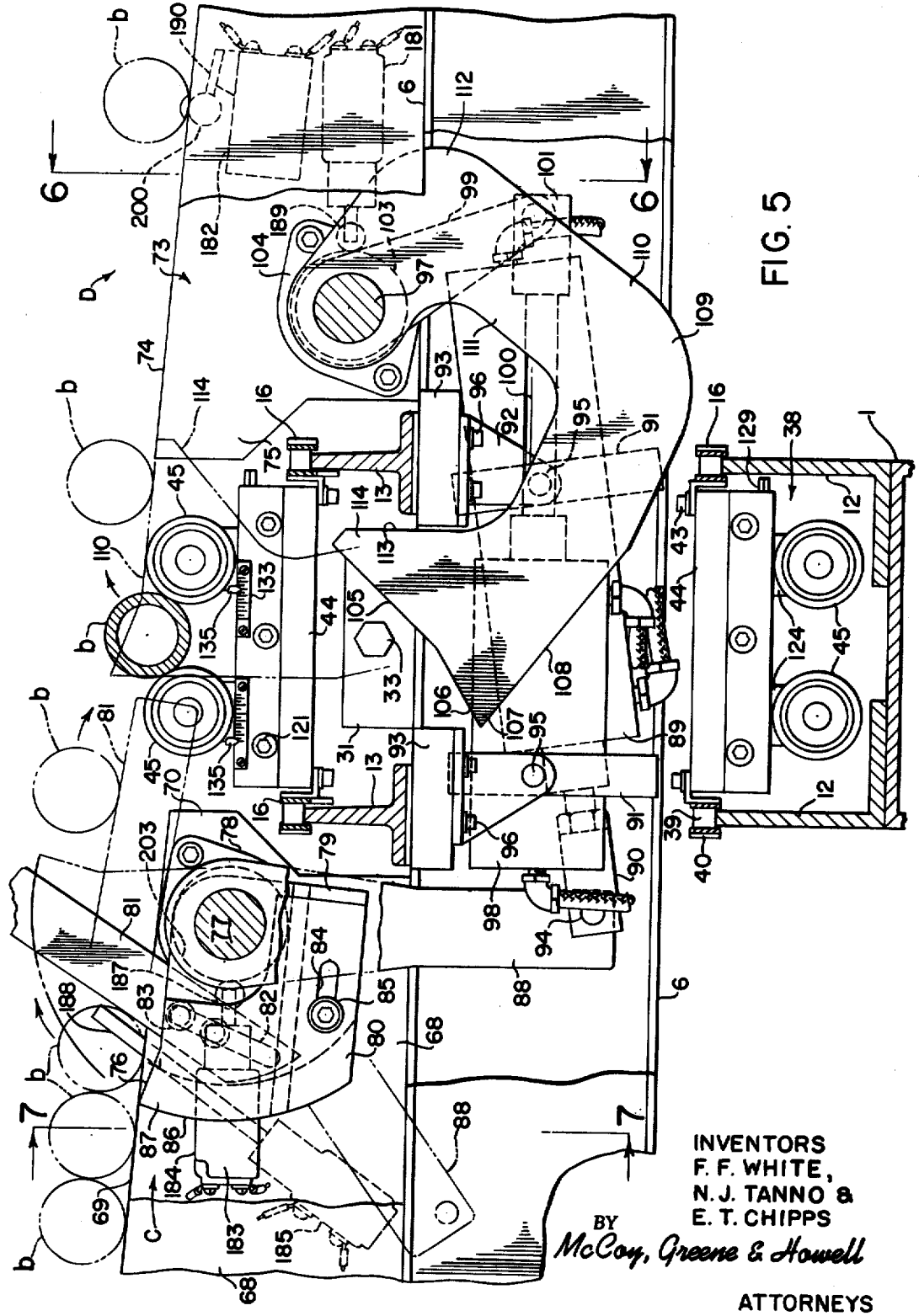
FIGURE 5 is a fragmentary transverse vertical sectional view taken substantially on the line 5—5 of FIGURE 2 and on a larger scale, the parts being shown in solid lines in their fully retracted positions and in dot-dash lines in their advanced positions.

Referring more particularly to the drawings which are drawn substantially to scale and in which like parts are identified by the same numerals throughout the several views, FIGURES 1 and 2 show a fan and tube feeder A constructed according to the present invention and arranged for automatic feeding of individual bars or tubes to a machine B such as a turret lathe or the like having a conventional drive spindle (not shown) to effect rotation of the bar during the machining operation. The feeder A has an escapement assembly C, and an unloading assembly D located on opposite sides of a conveyor assembly E.

The feeder A has a rigid steel frame E including a long seamless steel box beam 1 extending the full length of the feeder. As herein shown, said box beam is supported by three pairs of laterally aligned vertical legs or posts. The front posts 2 are longer than the intermediate posts 3 and 3a, and the latter posts are somewhat longer than the rear posts 4. The front posts 2 are rigidly connected to a pair of vertically aligned horizontal channels 5 perpendicular to the box beam 1, the lower channel 5 being connected to the box beam and supporting the front end thereof. A pair of vertically aligned horizontal channels 6 are rigidly connected to the legs 3 in the same manner, and a pair of short vertically aligned horizontal channels 7 are rigidly connected to the rear legs 4. The lowermost channels 5, 6 and 7 are rigidly connected to the bottom of the box beam 1 and support the beam in a horizontal position perpendicular to said legs.

The frame F also includes a pair of laterally aligned horizontal side channels 8 which extend between the front legs 2 and the intermediate legs 3 parallel to the box beam. Transverse horizontal channels 9 extend between the channels 8 parallel to the channels 5 and 6 and are rigidly connected to said channels. Short vertical channels 10 and 11 are mounted on the tops of the channels 8 at opposite ends of the channels 9. The horizontal upper surfaces of the channels 10 are at the same elevation as the upper surface of the posts 3a, and the flat upper surfaces of the channels 11 are at the same elevation as the upper surface of the posts 3, as shown in FIGURE 1. All of the posts and channels mentioned above are rigidly mounted through use of welding or the like to provide a strong rigid framework, such framework being reinforced by the box beam 1 to maintain the parts in proper positions at all times in spite of the great length of the feeder.

The box beam 1 is reinforced by a pair of angle irons 12 which also serve as parallel horizontal side rails for supporting the lower flights of the endless conveyor chains. Said angle irons are rigidly connected to the top of the box beam and preferably extend substantially the full length of the beam. A pair or horizontal side rails 13 are rigidly mounted on the channels 5, 6 and 7 parallel to the box beam 1 to provide laterally aligned supporting surfaces for the upper flights of the conveyor chains.

As shown herein, the bar feeder A has a conveyor assembly E which is reciprocated by means of a drive assembly 14 including a reversible rotary vane-type air motor 15. The conveyor is preferably of the chain type and preferably has one or more endless roller chains for supporting the bars or tubes as they are fed individually to the machine B. As herein shown, the conveyor assembly tion on the frame F. The front sprockets are mounted on front and rear sprockets 18 which are mounted for rotation on the frame F. The front sprockets are mounted on a sprocket shaft 19 which is mounted for rotation in bearings 20 carried by a rigid support 34 at the front of the frame. Said support is connected to and supported by vertical supporting plates 35 rigidly mounted on opposite sides of the box beam, said plates being reinforced by transverse horizontal plates 36. The rear sprockets 18 may be supported in a generally similar manner as by means of a horizontally projecting support 37. If desired, the rear sprocket may be adjusted as disclosed, for example, in applicants' copending application Ser. No. 600,350.

A horizontal sprocket shaft 21 is rotatably mounted on the box beam 1 parallel to the sprocket shaft 19 by bearings 22 and has sprockets 23 and 24 rigidly mounted thereon as shown in FIGURES 3 and 4. A drive sprocket 25 is rigidly mounted on one end portion of the shaft 19, and a small drive sprocket 26 is rigidly mounted on the shaft of the air motor 15. An endless drive chain 27 is mounted on the sprockets 24 and 26, and a similar chain 28 is mounted on the sprockets 23 and 25, whereby the motor 15 can effect forward or reverse rotation of the sprockets 17 to advance or retract the chain 16.

As herein shown, a pair of internally threaded angle brackets 29 are rigidly mounted on the rails 12 and receive a pair of vertical adjusting screws 30, whereby the position of the sprocket shaft 21 may be adjusted to adjust the tension in the drive chains.

Suitable means may be provided to limit the advancing or retracting movement of the conveyor chains 16. As herein shown, a metal stop block 31 is rigidly mounted on the upper plate 36 between the sprockets 17. Said block is internally threaded to receive an adjusting screw 32 having a rear stop portion 33 for engaging a stop member carried by the chain.

Each chain 16 is a conventional roller chain similar to a bicycle chain having a series of regularly spaced rollers 39 held in position by a series of links 40. Some of these links are replaced by supporting members 41 which serve as supports for a series of bar-receiving carriers 38, said members having vertical link portions 42 which fit on the chain like the links 40. The horizontal portion of each supporting member 41 is rigidly connected by a screw 43 to a horizontal carrier block 44 of rectangular cross section which extends laterally between the two chains 16. Two pairs of cylindrical metal rollers 45 are located above each carrier block for supporting a bar or tube b as shown, for example, in FIGURE 8. A series of carrier blocks 44 are mounted along the length of the conveyor E in alignment so that a bar b may be supported with its axis in a horizontal position parallel to the upper flights of the chain 16, preferably with said axis in a vertical plane midway between said flights.

Means are preferably provided for engaging the bar or tube b on the carriers 38 to cause them to move in unison with said carriers as they are advanced or retracted. Such means preferably engage the rear portion of the bar or tube on the carriers, and means are prefeably provided for gripping the bar or tube so that it will retract in unison with the carriers. It is usually preferable to provide pusher means which extend beyond the end of the feeder A when the bar or tube is advanced into the machine B.

As herein shown, a long pusher 50 is provided at the rear of the feeder A and is supported in cantilever fashion on the chains 16. The pusher has a horizontal base plate 49 mounted on and connected to the chain 16 for movement in unison therewith. A pair of vertical transverse internally cylindrical supporting plates 48 are rigidly mounted in alignment on the plate 49 to support the rear portion of the tube 53 parallel to the plate 49 and to the upper flight of the chain 16. Said plates 48 may be welded to or otherwise rigidly connected to the tube 53 and the plate 49.

A plurality of carriers 47 are mounted on the chains 16 at spaced locations to support the pusher rod 53 in a horizontal position coaxial with the bar or tube $b$ on the carriers 38, such carriers 47 moving out of engagement with the rod 53 when it is advanced forwardly beyond the sprockets 17.

A longitudinal stop bar 51 is rigidly mounted on the base 49 midway between the two chains 16 and projects forwardly a substantial distance parallel to the rod 53. The front portion of said stop bar is internally threaded to receive a stop screw having a head 52 for engaging the stop portion 33 of an adjusting screw 32 carrier by the block 31. Said head 52 and said portion 33 are in engagement when the pusher 50 is in its fully advanced position (see FIGURE 4).

As herein shown, the pusher 50 is extremely long and has a feed finger assembly 54 mounted for rotation somewhat like a conventional live center, but it will be understood that the entire rod 53 can be mounted for rotation if suitable bearings are provided above the base 49. It is preferable to use the type of construction shown in FIGURE 15 to reduce the inertia of the parts and the resistance to rotational acceleration.

Figure 15:
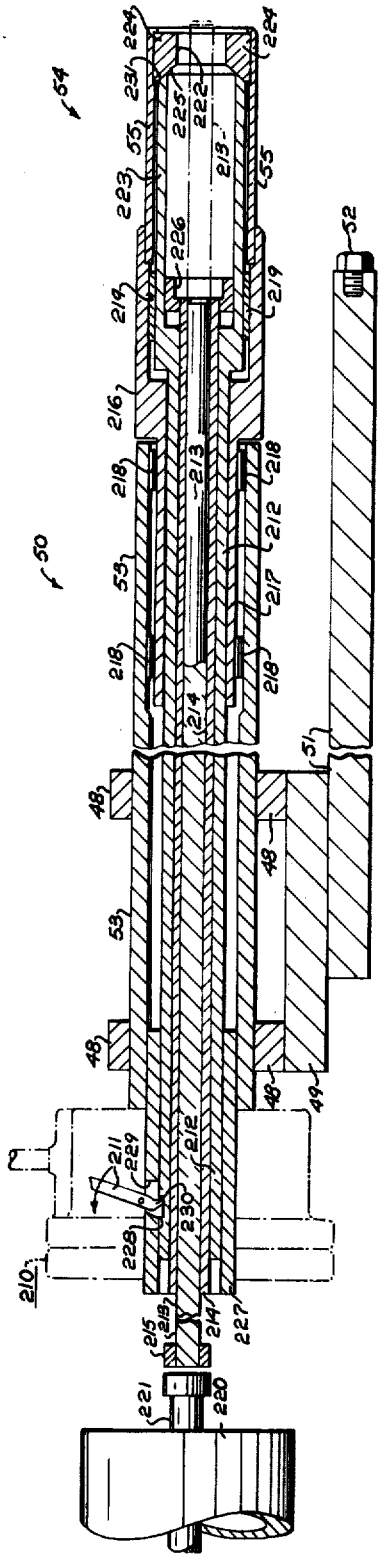
FIGURE 15 is a foreshortened schematic longitudinal vertical sectional view on a reduced scale showing the pusher assembly used in the feeder of FIGURES 1 to 14, the power cylinder being shown in dot-dash lines.

FIGURE 15 is a schematic representation of the pusher assembly. As shown in dot-dash lines in that figure, a donut-type pneumatic power cylinder 210 is rigidly mounted on the rear end portion 227 of the pusher rod 53 to effect opening of the feed finger assembly 54 so that it may slide over the rear end portion of a bar or tube $b$. Said power cylinder moves an actuating lever 211 counter-clockwise as indicated by the arrow in FIGURE 15 to effect opening of the feed fingers. The lever 211 extends through a slot 229 in the portion 227 and has a lower nose portion 230 which fits in a recess 228 in the tube 212 and engages the shoulder at the end of said recess to move the tube axially toward the segments 224 when the lever moves counter-clockwise. The tube 212 is coaxial with and surrounds a long cylindrical ejector rod 213 and a long ejector rod sleeve 214. The rod 213 has a length eight inches or so longer than the sleeve 214 and has a head 215 for engaging a similar head of an ejector piston rod 221. An ejector cylinder 220 is rigidly mounted on the frame F at the rear of the feeder A with its piston rod 221 coaxial with the ejector rod 213.

At the front of the pusher there is provided a rotatable annular supporting member 216 having a cylindrical end portion 217 extending axially into the forward end portion of the hollow rod 53. Said portion 217 has an internal cylindrical surface with a diameter slightly greater than that of the external cylindrical surface of the tube 212 and is rotatably mounted coaxial with the horizontal ejector rod 213 and the rod 53 by needle bearings or roller bearings 218 located near the opposite ends of the portion 217. A cylindrical bearing member 219 may also be provided between the external cylindrical surface of the non-rotating tube 212 and the internal cylindrical surface of the rotatable annular member 216.

Two or more feed fingers 55 are screwed into or otherwise rigidly connected to the member 216 to provide a longitudinally split cylinder surrounding the cylindrical portion 223. Feed fingers of this type are conventional and are described in said copending application Ser. No. 600,350. Such fingers have three removable segments 224 which fit together end to end within the end portions of the fingers 55 to provide a cylindrical surface 222 for gripping the external cylindrical surface of a bar or tube $b$ carried by the carriers 38. The segments 224 are chosen in accordance with the diameter of the bars or tubes being fed to the machine.

Each segment 224 has a frusto-conical surface 225 with the same taper as the frusto-conical surface 231 at the end of the member 212. When the lever 211 is actuated by the cylinder 210, the tube 212 is moved forward against the tapered surface 225. The wedging action spreads the segments 224 radially outwardly to permit them to slide axially over the end portion of a bar or tube $b$ on the carriers 38. It is preferable to provide one or more removable inserts 226 at the forward end of the sleeve 214 of a size to receive the rear end of the bar $b$ and to hold it coaxial with the rod 213, whereby the bar $b$ is rigidly held coaxial with the pusher rod 53 when the tube 212 is retracted away from the segments 224. The internal cylindrical surface provided by the insert or inserts 226 would have substantially the same diameter as the internal cylindrical surface of the closed grippers 224 and approximately the same diameter as the bar $b$. Of course, the size of the members 224 and 226 is changed whenever the diameter of the bar $b$ is changed.

After the machining operations have been completed in the machine B, the pusher 50 is retracted and the feed fingers 55 pull the bar $b$ out of the machine and return it substantially to the position shown in solid lines in FIGURE 2. When the pusher approaches its fully retracted position, the limit switch 159 on the support 156 is tripped. This initiates operation of the ejector cylinder 220 to advance the piston 221 against the ejector rod. Said piston moves the rod forwardly to the position shown in dot-dash lines in FIGURE 15, wherein the front end of the rod projects beyond the end of the fingers 55 and the head 215 engages the rear of the sleeves 214. Tripping of said switch 159 also energizes the donut-type cylinder 210 to move the lever 211 counterclockwise and to open the feed fingers 55, whereby the bar $b$ is ejected by the ejector rod 213.

As the ejector piston 221 approaches its fully advanced position, the limit switch 207 is tripped. This indicates that the bar $b$ has been ejected and initiates retraction of the piston 221 by the cylinder 220.

It will be understood that the pusher 50 may be replaced by pushers of various constructions having suitable means for gripping the end of the bar $b$. The pusher may, for example, be of the rotatable type disclosed in said copending application Ser. No. 600,350, and may have a long pusher rod which rotates in unison with the bar $b$. When a long rotatable pusher rod is employed, it is desired to provide means for rotatably supporting the rod in a horizontal position when it projects forwardly from the front end of the pusher.

As herein shown, a pusher support assembly 56 is provided to support the pusher rod after it moves out of contact with the pusher carriers 47, but it will be understood that such assembly is optional and may be omitted. The assembly 56 has a vertical standard 57 rigidly mounted on a base plate 58 by bolts 59, said base plate being welded to or otherwise rigidly mounted on the front top portion of the box beam 1. A housing base plate 60 is rigidly mounted on the top of the standard 57 by bolts 61 to provide a rigid support for a cylindrical housing 62. As herein shown, said housing is welded or otherwise integrally connected to the base 60 by means of generally triangular reinforcing plates 36 located at opposite ends of the housing. An axially elongated internally cylindrical sleeve 64 is rotatably mounted in the housing 62 by ball bearings 65 located at opposite ends of the housing, said sleeve projecting a substantial distance outwardly from both ends of the housing and having a beveled surface 66 to facilitate entry of the pusher rod into the sleeve. Such sleeve is preferably made of brass or other metal softer than the steel of other metal used to form the pusher rod 53 to minimize wear on the rod.

The portion of the rod which is located within the sleeve 64 when the stop members 33 and 52 are in engagement has an external surface which is cylindrical and of substantially the same diameter as the internal cylindrical surface of the sleeve 64, and the sleeve 64 is so located as to support the rod 53 with its axis in the proper horizontal position so that there is no substantial vibration of the pusher rod when it is rotated by the spindle of the machine B. Also, the rod 53 preferably has a uniform diameter throughout its length so that the sleeve 64 will maintain the rod 53 in its proper position while the rod is advanced for many feet by the conveyor. In a machine of the type shown herein, the distance from the pusher housing 48 to the feed finger assembly 54 may be 8 to 12 feet or more and pusher support assembly 56 may provide a front support for the pusher while it is being advanced more than 10 feet beyond the end of the conveyor E. Such a long extension of the pusher rod is usually not necessary but is sometimes required because of the location of parts in the machine B.

The portions of the frame F extending laterally from the box beam 1 to the legs 2, 3, and 3a are employed in the feeder A shown herein to provide a feed rack at one side of the conveyor and an unloading ramp at the opposite side of the conveyor. Four tapered vertical feed rack plates 68 are welded to the horizontal channels 5, 6 and 9 and to the vertical channels 2, 3a and 10 to reinforce the frame and to provide a feed ramp surface for supporting a row of bars or tubes for feeding laterally toward the conveyor E. The plates 68 have straight inclined upper surfaces 69 which are horizontally aligned and located substantially in a plane parallel to the upper flights of the chains 16. Such surfaces may be formed of a wear resistant plastic or a soft metal such as brass. As herein shown, each plate 68, has an end portion 70 which projects inwardly over the top of one of the chains 16 to a position close to the path of movement of the carriers 38. The plate 68 shown mounted on the channel 5 is optional and may be omitted.

The feed rack preferably has means for guiding the ends of the bars or tubes b so that each bar is in the proper position when it is advanced onto the carriers 38. As herein shown, a guide member 71 is provided in the form of an angle iron extending in a direction parallel to the surfaces 69 and rigidly mounted on the frame by longitudinal supporting members 72. The guide member 71 is located to guide the bars or tubes to a position just beyond the end of the feed finger assembly 54 so that said assembly need be moved only a short distance into engagement with the rear of each bar or tube b on the conveyor.

The unloading ramp is located on the side of the box beam opposite from the feed rack to guide the bars or tubes laterally away from the conveyor after completion of the machining operations. As herein shown, four vertical plates 73 are welded to the horizontal channels 5, 6 and 9 and to the vertical channels 2, 3 and 11 in positions perpendicular to the box beam 1 and parallel to the plates 68 to provide the unloading ramp. Each plate 73 has a straight inclined upper surface 74, similar to the surfaces 69, which may also be covered with a plastic or brass. Said surfaces 74 are in horizontal alignment and are preferably located in a plane parallel to the central axis of the box beam. The inclination of the surfaces 74 may be the same as or different from the inclination of the surfaces 69, such inclination being selected to provide the desired rate of rolling of the bars away from the conveyor. Each plate 74 preferably has a portion 75 projecting over one of the chains 16 adjacent the path of movement of the carriers 38 as shown in FIGURE 5, the surface 74 preferably extending to the inner edge of the portion 75. The plate 74 on the channel 5 is optional and may be omitted.

A longitudinal rock shaft extends through the four vertical plates 68 parallel to the box beam and is rotatably supported on said plates by suitable bearings held in place by the bearing brackets 78. A series of plates 79 are rigidly mounted at spaced locations along the length of the shaft 77 to provide supports for a series of escapement fingers 80 and a series of rectangular ramp bars 81. Each of said bars has an elongated slot 82 which receives a pair of adjusting screws 83, whereby the ramp bar may be rigidly clamped in a series of adjusted positions on the plate 79, said plate having internally threaded bores to receive said adjusting screws. Each escapement finger 80 has an elongated slot 84 for receiving an adjusting screw 85, which screws into the plate 79 like the screws 83. Each escapement finger has an arcuate outer surface 86 substantially concentric with the shaft 77 and may be moved toward or away from said shaft to the extent permitted by the slot 84. Each finger 80 has a projecting end portion 87 with an inclined upper surface 76 for engaging the bar or tube b adjacent the bar 81 when the escapement finger is advanced by turning the shaft 77. The surface 76 has sufficient slope so that such bar or tube will not roll back toward the feed ramp when it is first contacted by the fingers 87.

Figure 6:
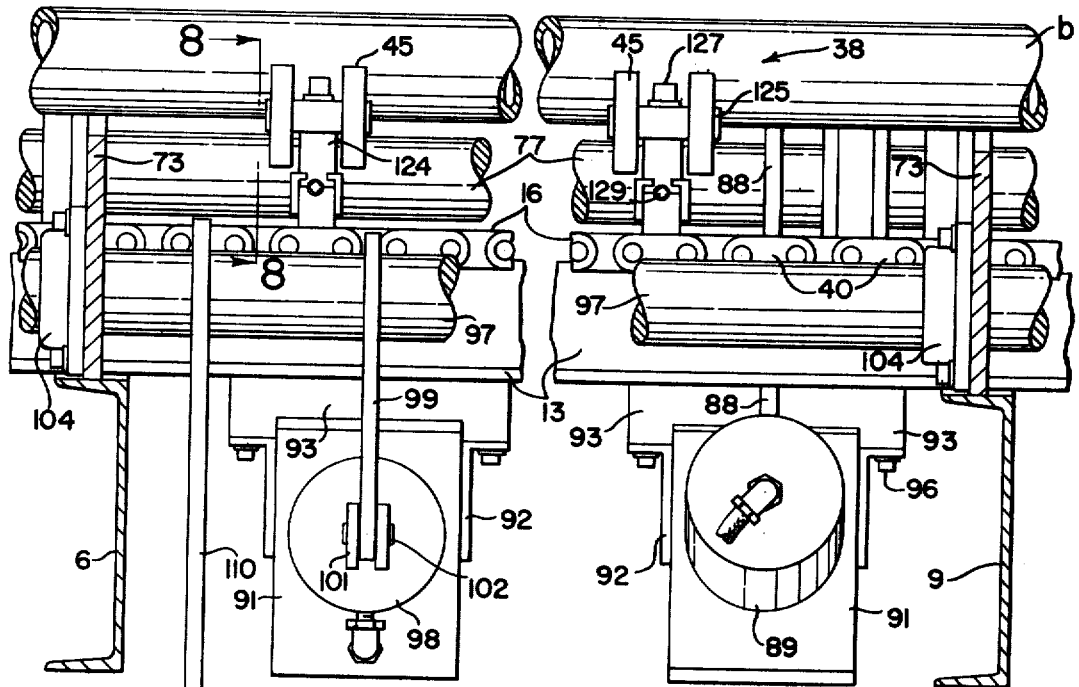
FIGURE 6 is a foreshortened fragmentary longitudinal vertical sectional view taken substantially on the line 6—6 of FIGURE 5.
Figure 7:
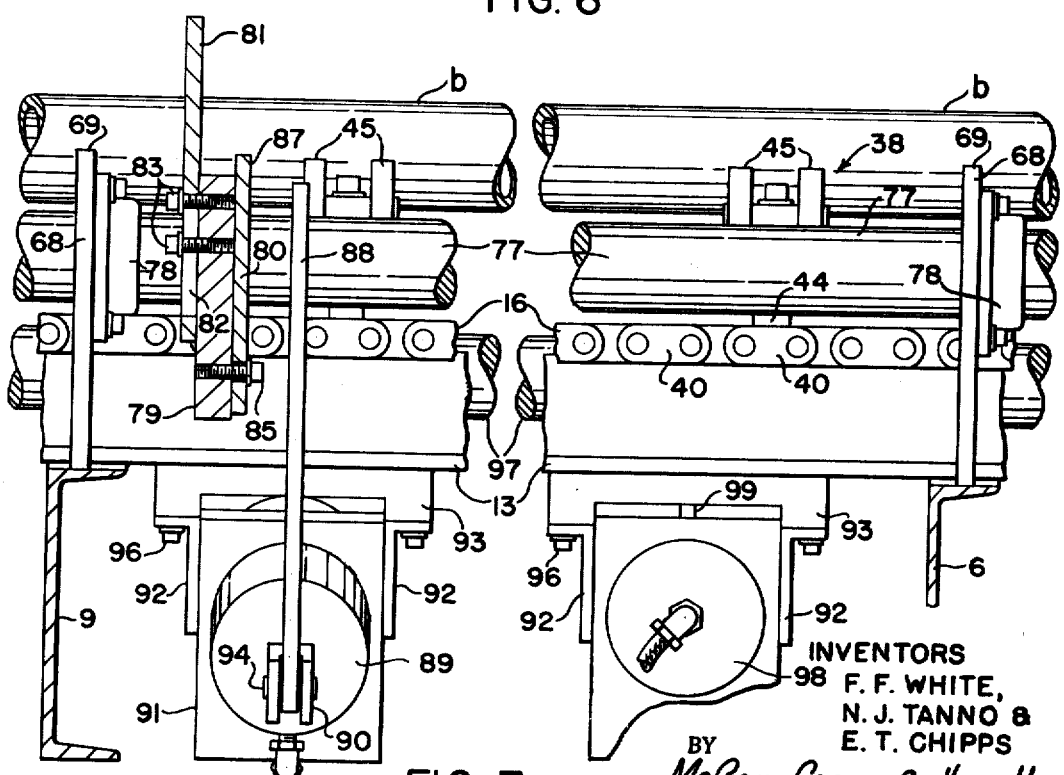
FIGURE 7 is a foreshortened fragmentary longitudinal vertical sectional view taken substantially on the line 7—7 of FIGURE 5.

A lever arm 88 is rigidly connected to the shaft 77 and is operated by a pneumatic cylinder 89 to effect the desired rocking movement of the shaft 77 and the escapement fingers 80. The piston rod of the cylinder 89 is pivotally connected to the lever 88 by a pivot pin 94 and a bifurcated connecting member 90. The housing of the cylinder 89 is pivotally supported on the frame F by means of a pivoted plate or bracket 91 having pivot pins 95 supported by L-shaped support members 92 on opposite sides of said bracket. Said support members 92 are rigidly connected by screws 96 to a support block 93 which is rigidly mounted on the bottom of one side rail 13 as shown in FIGURES 5 and 6. An identical support block 93 is mounted on the other side rail 13 together with similar supporting elements 91, 92 and 95 to provide a similar pivotal support for a second pneumatic cylinder 98.

A horizontal rock shaft 97 extends through the four plates 73 and is rotatably supported therefrom by bearings 103 similar to the bearings of the rock shaft 77 and having similar bearing brackets 104 mounted on the plates 73. A lever arm 99 is rigidly connected to the shaft 97 and is pivotally connected to the piston rod 100 of the pneumatic cylinder 98 by the bifurcated connector 101 and a pivot pin 102. The housing of the cylinder 98 swings on its pivot 95 when the piston rod 100 is advanced or retracted to effect turning of the shaft 97.

A series of flat C-shaped ejector fingers 110 are rigidly mounted on the shaft 97 to move in unison therewith between the retracted position shown in solid lines in FIGURE 5 and the advanced position shown in dot-dash lines in that figure. All of the ejector fingers have the same shape and are aligned with the other ejector fingers, but it will be understood that such fingers may be adjustable if desired.

As shown in FIGURE 5, each ejector finger 110 has a flat upper surface 105, a flat sloping surface 106 and a generally triangular pointed end portion 107 having a flat face 108 generally perpendicular to the plane of the surface 105. Each finger also has a rounded central portion 109, a generally straight portion 111 and a rounded portion 112 near the shaft 97. The upper portion 114 of each ejector finger opposite the upper portion 107 preferably projects a substantial distance away from the portion 107 and has an inwardly sloping surface 113 so that said portion 114 will support a bar *b* after the bar has moved into engagement with the unloading ramp surface 74.

The ejector finger is so shaped that it will clear the side rail 13 as it moves from its retracted to its advanced position shown in dot-dash lines in FIGURE 5. When in said advanced position, the upper surface 105 is preferably located substantially in the plane containing the ramp surfaces 74 and the projecting portion 114 preferably projects beyond the plane containing the vertical surfaces of the end portions 75 of the unloading ramps so that the bar *b* will roll smoothly without interruption from the carriers 38 to the unloading ramp. The inclination of the surface 106 is sufficient to initiate rolling of the bar *b* toward the unloading ramp and to prevent rolling toward the feed ramp when the ejector fingers are moved against the bottom of the bar *b*. It will be understood, of course, that the shape of the ejector fingers 110 may be changed considerably.

Details of each carrier 38 are illustrated in FIGURES 8 and 9. The carrier block 44 is rigidly mounted in a horizontal position perpendicular to the upper flights of the chains 16 by the supporting members 41 and screws 43. Each block 44 has a rectangular cross section and is adapted to receive a pair of rectangular slide plates 116 each having an inwardly directed flange 117 parallel to and spaced above the flat horizontal upper surface 118 of the block 44. The block 44 has three transverse internally threaded bores which receive six attaching screws 121 for rigidly clamping the slide plates 116 in position. A pair of semicylindrical slots 119 are provided in said upper surface of the block with a common axis in the plane of the surface 118 midway between the plates 116. Each slot 119 extends from one end of the block 44 to a shoulder 120 near the center of the block.

The flanges 117 and the horizontal surface 118 provide ways for a pair of rectangular carriage blocks 124, each of said blocks having laterally aligned horizontal grooves 123 of a size to receive the flanges 117. A short shaft member 125 is rigidly mounted on the top of each block 124 and has a central portion 126 of rectangular cross section with a vertical bore of a size to receive a screw 127, which screws into the block 124. A pair of the externally cylindrical rollers 45 are rotatably mounted on the opposite cylindrical end portions of the shaft 125 with their external cylindrical surfaces in axial alignment as shown in FIGURE 9, and the axes of the two shafts 125 of each carrier 38 are in the same horizontal plane as shown in FIGURE 8.

A long adjusting screw 128 is provided having a square tool-receiving head 129 projecting beyond one end of the block 44 and having a cylindrical central portion 130 of reduced diameter rotatably mounted on the central upper portion of the block 44 at the shoulder 120. The bottom central portion of each block 124 has a threaded generally semi-cylindrical surface which conforms to the engaging threads of the adjusting screw 128. One block 124 of each carrier 38 has right-hand threads and the other block 124 has left-hand threads, the threads of the adjusting screw being reinforced on opposite sides of the central portion 130, whereby rotation of the adjusting screw will simultaneously move the blocks 124 of each carrier equal distances in opposite directions. The shoulder 120 prevents axial movement of the adjusting screw when it is turned. Thus, it is a simple matter to change the position of the rollers 45 from the position shown in solid lines in FIGURE 8 (suitable for supporting the large tube *b*) to the position shown in dot-dash lines in that figure (suitable for supporting a smaller diameter bar *b'*) merely by turning the adjusting screw 128 in one direction. If desired, a set screw or the like may be provided in each block 124 to lock the block in its adjusted position, but this is not essential. Likewise vertical adjustment of the rollers 45 is optional.

Each carrier 38 is provided with means for indicating the proper location of the rollers 45 for bars *b* of a given diameter. A ruled indicator plate 133 is mounted on the side face of one of the plates 116 adjacent each of the two carriage blocks 124 and is rigidly held in a horizontal position against the vertical face of such plate by a pair of screws 134 as shown in FIGURES 5 and 8. A vertical pointer 135 is rigidly mounted at the corner of each block 124 by a screw 136. Such pointer moves along the ruled surface of the plate 133, and its bottom point indicates the position of the roller 45. The indicia means 133 and 135 enable the operator to rapidly adjust the rollers 45 to predetermined positions in accordance with the diameter of the bars or tubes to be received by the carriers 38.

It is preferable to provide means for stopping movement of the bar or tube *b* so that the pusher 50 may be forced against the end of the bar or tube with sufficient force to open the feed fingers 54, whereby the bar or tube is accurately positioned relative to the pusher 50 and relative to the stop means 33 and 52. As herein shown, a horizontal channel 138 extends transversely between the upper ends of the posts 2 and is welded to said posts. A vertical bracket 139 is rigidly mounted on the channel by means of screws 137 to provide a support for a swing stop assembly 140 located directly above the conveyor midway between the posts 2. The bracket has a yoke 141 at the upper end thereof providing a rigid support for a pivot pin 142 which pivotally supports an air cylinder 143 having a downwardly projecting piston rod 144.

The lower end of such piston rod is connected to a pair of widely spaced links 146 by a pivot pin 145. Such links are in alignment and are pivotally connected by a pivot shaft 147 to the projecting portion 148 of said bracket 139, whereby the actuation of the cylinder 143 causes the axis of the pivot pin 145 to move in a path concentric to the pivot pin 147. A main pivot pin 149 connects the stop finger 150 to the portion 148 and permits such finger to swing about the axis of the pin 149 from the retracted position shown in dot-dash lines in FIGURE 13 to the advanced vertical position in the path of movement of the bar *b* as shown in solid lines in that figure.

A pair of short links 151 are mounted in alignment on opposite sides of the stop finger 150 and are pivotally connected to the stop finger by a short pivot pin 152 which extends through both links 151 and terminates at the outer surface of said links. Thus, the links 151 can swing relative to the links 146 during movement of the piston rod 144. The stop finger 150 has a pair of laterally projecting stop portions 154 which limit the clockwise movement of the links 146 when the parts are in the positions shown in solid lines in FIGURE 13. When the parts are in these positions, the stop portions 154 engage the bottom surfaces of the links 146 and assist in maintaining the pivot pin 152 substantially at the line of centers of the pins 145 and 147 so that the stop finger will resist a very heavy axial force by the bar *b* even though the amount of force required by the motor 143 to retract the stop finger is relatively small.

The operation of the various air cylinders and motors of the apparatus A may be controlled manually or automatically, and it is usually preferable to employ limit switches or the like. It is also preferable to provide means for ready adjustment of the position of the limit switches. FIGURE 14 illustrates a novel arrangement for mounting limit switches which permits a ready change in the number or position of the limit switches in accordance with the type of operations being performed. The limit switch mounting assembly 155 shown in FIGURE 14 includes a long horizontal channel 156 which is rigidly mounted on the frame F parallel to the conveyor chains 16 by spaced L-shaped brackets 157 which are rigidly connected to the side rail 13 at spaced points along its length. As herein shown, the channel 156 has a uniform cross section throughout its length as shown in FIGURE 14 and has a pair of inturned lips 158 located in horizontal alignment.

Any number of limit switches 159 may be mounted on the channel 156. Each switch has a flat rectangular mounting plate 160 which is adapted to rest in a horizontal position on the lips 158. Said plate is rigidly held in position on the channel by a clamping member 161 within the channel and a vertical screw 162 which screws into the center of the member 161. It is preferable to provide a helical spring to bias the member 161 against the lips 158 so that said clamping member will remain in its proper position when the screw 162 is loosened. Such spring may be soldered or otherwise rigidly connected to the member 161 so as to slide with that member when the plate 160 is slid to a different position. The lips 158 may be turned downwardly to project into straight narrow grooves 164 in the upper face of the clamping member so as to guide the clamping member when it is slid in the channel to a different position.

A pair of clamping members 161 and a pair of screws 162 may be used with each mounting plate 160 and may be located at opposite ends of that plate and on opposite sides of the limit switch 159.

As herein shown, the switch 159 has a forwardly projecting portion 166 which supports a vertical pin 167. A horizontal arm 168 is rigidly connected to the pin 167 and provides a support for a roller 169 located out of the path of movement of the conveyor E and the carriers 38 and above one of the chains 16. An element may be mounted on the chain or any of the members carried by that chain for engagement with the roller 169 to actuate the lever 168 and to throw the associated limit switch 159 to control one of the operations, such as reversing an air motor or energizing one or more of the pneumatic cylinders. As herein shown, an arm 165 is rigidly mounted on one of the plates 48 for engaging the roller 169 to throw the switch.

A number of switches 179 to 185 are provided in connection with a suitable manual or automatic control system. The switches 179 and 180 shown in FIGURE 4 are deceleration and location switches for controlling the movement of the conveyor. Each of these switches has a cam roller 201 rotatably mounted on an actuating arm 202 which is held in position by an adjusting screw 204. Each arm 202 has a slot 205 to receive the adjusting screw and to permit mounting of the arm in a large number of different positions. Each roller 201 is normally in the path of movement of the cam projection 206 on the stop bar 51 carried by the pusher 50. Each roller is lowered by the cam 206 when the pusher is near its fully advanced position to trip the switches 179 and 180. Tripping of the switch 179 causes reduction in the pressure and volume of air supplied to air motor 15 so as to decelerate the conveyor before the stop member 52 engages the stationary stop 33. Tripping of the switch 180 turns off the supply of power fluid to the air motor 15 after a predetermined time delay sufficient to permit the collet of the machine B to grip the bar $b$.

The safety switch 181 associated with the unloading assembly D is controlled by a cam roller 189 which rides on a cam ring 103 rigidly connected to the rock shaft 97. Said switch is tripped when the raised portion of the cam 103 engage the roller 189 to indicate that the ejector fingers are out of the path of movement of the carriers 38.

A switch 182 is preferably mounted on one of the plates 73 to indicate when the bar $b$ has rolled down the unloading ramp. The switch 182 has an actuating arm and a cam roller 200 which normally projects a fraction of an inch above the upper surface 74 of the unloading ramp. Engagement of the bar with such roller effects tripping of the switch 182.

The escapement assembly C has two switches 183 and 184, as shown in FIGURES 2 and 5, each switch being operated in the same way but at different times. Each switch is controlled by a cam roller 187 and a cam ring 203 which is rigidly mounted on the rock shaft 77. The engagement of the raised portion of the cam ring with the roller 187 effects tripping of the associated switch. The switch 183 is tripped when the escapement arm is in the fully advanced loading position, and the switch 184 is tripped when the escapement arm returns to the fully retracted position.

A switch 185 is mounted on one of the plates 68 and has an actuating finger 188 projecting above the upper surface 69 of said plate to engage the bar $b$ above the retracted escapement fingers 80 as shown in FIGURE 55. The finger 188 closes the switch 185 whenever there is another bar ready for feeding to the conveyor.

Switches 207 and 208 are mounted on the conveyor at the rear of the pusher midway between the chains 16 to move in unison with the conveyor.

If desired, each of the switches 179 to 185, 207 and 208 may be employed to energize a ready light on an indicator panel, and each operation of the machine may be performed manually by an operator relying on such signal lights. However, it is preferable to employ such switches in an automatic electrical control system as will be apparent from the description which follows:

Before starting a cycle, the pusher 50 is fully retracted as shown in FIGURES 1 and 2, the ejector rod 213 is in the full forward position shown in broken lines in FIGURE 15, and the collet of the machine B is open. Assuming that the electrical controls art set for automatic operation, the operator presses the cycle start button. If the feed ramp is empty the switch 185 is open and nothing happens. If the feed ramp is full and switch 185 is closed, then pushing the start button closes the circuit to initiate supply of air to the cylinders 89 and 98 and to initiate operation of a first timer.

The ejector arms 110 swing up to the position shown in broken lines in FIGURE 5 and the escapement fingers 80 pick up one bar and cause it to roll down the ramp bars 81 against the projecting portions 107 of the ejector arms. The switch 183 is tripped when the escapement fingers reach the fully advanced position, thereby energizing a second timer and energizing the solenoid for the cylinder 143 to lower the stop 150 of the swing stop assembly. After a predetermined time delay, said second timer energizes the solenoids for the cylinders 89 and 98 to initiate retraction of the escapement fingers 80 and the ejector arms 110. When the escapement fingers are fully retracted, the switch 184 is tripped, and when the ejector arms are fully retracted the switch 181 is tripped indicating that the feeder is ready to feed.

When the machine B is ready to receive a bar $b$, the contacts from that machine are closed and the solenoid for the air motor 15 is energized to effect forward movement of the conveyor. As the pusher 50 moves forward, the bar $b$ is trapped between the open feed fingers 55 and the stop 150 and engages the ejector rod 213. This drives the ejector rod rearwardly relative to the pusher 50 and trips the switch 208 when the rod is in its rearmost position shown in FIGURE 15 and the bar $b$ is fully seated. The power unit 210 is thereby deenergized, the tube 212 moves rearwardly, and the feed fingers 55 close to grip the bar $b$. At the same time the solenoid for the swing stop is deenergized so that the stop 150 returns to its upper retracted position out of the path of movement of the bar.

As the feeder continues to be moved forward by the motor 15 and approaches its fully advanced position, the cam 206 trips the deceleration switch 179 to reduce the pressure and volume of air supplied to said air motor. The conveyor continues to move forward at a slower speed and to decelerate until the stops 33 and 52 are almost in engagement, at which time the cam 206 trips the switch 180 to energize a third timer. After a predetermined time delay sufficient to insure closing of the collet of machine B, the third timer stops operation of the air motor 15.

After the desired cutting, grinding or machining operations are completed by the machine B, its collet opens and in timed sequence the air motor 15 is reversed. The air motor then retracts the pusher and the bar gripped thereby at full speed.

The solenoid 159 is tripped as the pusher approaches its fully retracted position to discontinue the supply of air to the motor 15 and to initiate the supply of air under pressure to the ejector cylinder 220 and the power unit 210, whereby the tube 212 advances to open the feed fingers 55 and the ejector piston 221 moves forwardly against the ejector rod 213. When the ejector rod moves forwardly to the position shown in broken lines in FIGURE 15 to eject the bar $b$, it trips the switch 207 and thereby effects retraction of the ejector piston 221 and operation of the air cylinder 98 to raise the ejector arms 110.

The arms 110 move to the position shown in broken lines in FIGURE 5 to lift the bar $b$ off the rollers 45 and to cause it to roll down the unloading ramp. As the bar passes over the arm 190, it trips the switch 182 to effect retraction of the arms 110. When the arms are fully retracted, the switch 181 is tripped to complete one cycle. The same steps are then repeated for each successive cycle whenever the machine B signals for another bar. If desired, the various motions may be electrically interlocked, and suitable switches may be provided for manual operation for purposes of set-up and testing of each sequence.

It will be understood that various types of pushers and feed finger assemblies may be used in the apparatus of this invention. An apparatus of the type shown in FIGURE 15, for example, may be replaced with apparatus of the type disclosed in said application Ser. No. 600,350, or with apparatus of the type shown in FIGURE 16. The latter figure shows a bar and tube feeder having a pusher 50a having a base 49a mounted on the chain 16 to move in unison therewith, the center line $c$ of said chains being shown in dot-dash lines. A channel 156a similar to the channel 156 is provided on the frame and extends between a vertical supporting plate 233 and the rear leg 4a of the frame. A horizontal angle 234 is provided below the channel and is welded to the plate 233 and to the leg 4a. Otherwise the frame of the feeder may be substantially the same as the frame F previously described. A limit switch 159a, similar to the switch 159, is mounted on the channel and functions in the same way.

The pusher has a vertical support plate 235 welded to the base 49a to provide a rigid support for the cylindrical housing 236, which is rigidly held against the plate 235 by the hexagonal rear portion 237 of the pusher. The opposite end of the pusher housing 236 is internally threaded to receive the conventional feed fingers 55a, which have three removable segments 224a for gripping the end of the bar $b$. Each of the removable segments has a tapered frusto-conical surface 241 for engaging the similarly tapered end portion of a horizontal cylindrical ejector rod 238 coaxial with the housing 236. Said rod has a collar 239 and is rigidly mounted in a fixed position on the horizontal bar 240 which extends between the two vertical plates 233.

A pneumatic cylinder 210a is rigidly mounted on the frame above the bar 240 and has a rigid vertical supporting plate 242 which holds the cylinder in a fixed position. The piston rod 243 of the cylinder is provided with an enlarged head 244 which is engageable with the upwardly projecting portion of the plate 235.

When the pusher 50a is advanced against the end of a bar $b$, the segments 224a and the feed fingers are held in an open position by the ejector rod 238 until the rear vertical face of the bar $b$ engages the vertical faces of the segments 224a or until the bar is fully seated. Further advancing movement of the pusher 50a moves the segments 224a off of the stationary ejector rod 238, and the powerful feed fingers 55a contract to grip the bar. Such arrangement of the pusher and the stationary ejector rod has not been satisfactory because of the large amount of power needed to slide the segments 224a over the stationary rod 238. Actually, the feed fingers 55a apply a tremendous radial force against the ejector rod, particularly when constructed to grip bars or tubes of relatively large size. Because of this it was heretofore necessary to obtain more power from the air motor driving the conveyor. There is no such problem when using a separate power unit, such as the unit 210 of FIGURE 15, to eliminate the additional load on the air motor 15.

Figure 16:
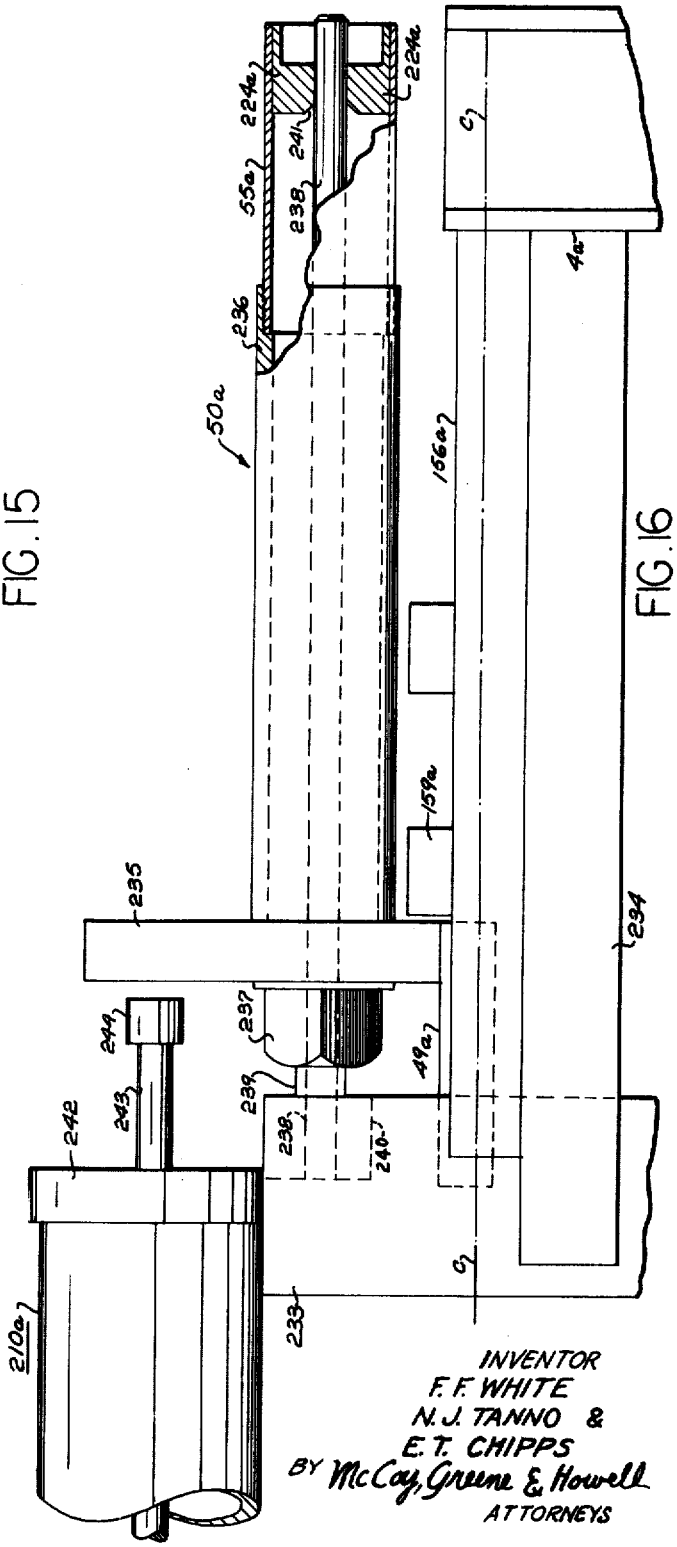
FIGURE 16 is a fragmentary side elevational view on a reduced scale with parts shown in section illustrating a modified form of pusher which may be used on the bar feeder of this invention.

In the apparatus of FIGURE 16, the power unit 210 is replaced by a pneumatic cylinder 210a which is supplied with air under pressure during the initial advancing movement of the pusher to force the pusher forwardly and assist the air motor 15 in moving the segments 224a off of the ejector rod 238.

The pneumatic cylinder 210a has a second function as a cushioning apparatus to assist in stopping the pusher when it reaches its fully retracted position. Air is supplied under pressure to the cylinder 210a as the pusher 50a is retracted and as it approaches its fully retracted position, whereby the advanced piston 243 engages the plate 235 and yieldingly resists movement of the pusher as it comes to rest, thus cushioning the stopping movement. As the pusher moves to its final position, the tapered surfaces 241 of the segments 224a engage the end of the ejector rod to effect spreading of the segments and opening of the feed fingers so that the ejector rod can eject the bar $b$ from the pusher.

It will be noted that the ejector fingers 110 of the feeder A perform more than one function. During feeding of a bar $b$ from the escapement assembly C to the carriers 38, the fingers 110 serve as a bumper device to resist or stop the rolling movement of the bar before it drops onto the rollers 45. After the machining operations have been performed on the bar $b$ in the machine B and the bar has been retracted by the feed fingers 54 and the conveyor E, the fingers 110 perform a different function as means for ejecting the bar $b$ and guiding it onto the unloading ramp surfaces 74. In a bar feeding machine where such unloading ramp is not used as, for example, in a feeder where the bar $b$ is cut into smaller pieces in the machine B, the bumper device 110 could have a quite different construction.

FIGURE 17 shows a bar and tube feeder A' which may have exactly the same construction as the feeder A described above except that the unloading ramps and associated unloading devices are omitted and replaced by a more simple and more compact equipment including a modified form of bumper device 110a which is operated by a reciprocating piston pneumatic cylinder 98a. In the feeder A' the posts 3 and adjacent parts of the unloading assembly D, including the vertical channels 2 and 11, are replaced by simple supporting posts mounted like the posts 4 of the feeder A. Thus, the post 3 is replaced by a vertical post or channel 3b. A similar set of channels may be mounted on the same side of the box beam 1 to provide supports for a series of bumper devices 110a located in alignment like the bumper fingers 110.

The bumper device at each post or channel could be constructed substantially as shown in FIGURE 17. As shown, there is provided a circular metal cushion plate 170 covered by a flat circular cushion pad 171 of uniform thickness formed of a suitable elastomeric or cushioning material, such as an elastic rubber or plastic. The hub portion 172 of the cushion plate has an internally threaded bore to receive the threaded end portion 174 of a horizontal piston rod 173 which is preferably located perpendicular to the direction of movement of the carriers 38. The cylindrical housing of the pneumatic cylinder 98a is rigidly mounted on the post 3b by a rectangular motor housing plate 175 welded to the post, and said pneumatic cylinder has a large mounting nut 176 for clamping the housing against the plate 175 to hold it in place and to permit removal of the housing when desired. The cylinder 98a may be operated to advance the cushion plate 170 from the positions shown in dot-dash lines in FIGURE 15 to the position shown in solid lines in that figure and also to return it to its initial retracted position. Thus, the bumper device 110a is moved into and out of the path of movement of the carriers 38.

The sequence of operations when using the feeder A' of FIGURE 17 may be substantially the same as when using the feeder A except for the unloading apparatus D which is not included in the feeder A'. The sequence of operations for loading an individual bar b onto the carriers 38 is almost the same however, and the air cylinder 98a may be operated at about the same time as the motor 98 of the feeder A. Thus, the piston rod of the air cylinder 98a is advanced toward the escapement assembly C before the bar b has rolled off the ramp means 81 to move the cushioning pad 171 into engagement with the bar before the bar rolls off the end of the ramp bars 81. For example, the plate 160 may be advanced from the retracted position shown in dot-dash lines in FIGURE 17 to the advanced position shown in solid lines in that figure before or at the same time as the pneumatic cylinder 89 is actuated to advance the ramp bars 81 to the position shown in solid lines in FIGURE 15, whereby the cushioning pad 171 will engage the bar b and slow down or stop its movement before such bar rolls off the end of the ramp bars 81 onto the rollers 45.

As the air acting against the piston of the cylinder 98a is compressible, such cylinder also acts as a shock absorber, the plate 170 yielding upon impact of the bar b with the pad 171. If desired, the force exerted by the air cylinder may be sufficiently low to permit the bar to move onto the rollers 45 by virtue of its inertia as it rolls down the ramp, in which case the device 110a would serve to decelerate the movement of the bar; however, it is preferable to apply sufficient force to the piston rod 173 to bring the bar b to a halt at the end of the ramp bars 81, for example, at the position shown in FIGURE 17, the supply of air to the cylinder 98a thereafter being reversed to gently lower the bar b onto the carriers 38. If desired, the piston rod 173 can be retracted at a slow rate to minimize the impact with the rollers 45. This may be important in the case of heavy bars.

The bar feeder of this invention constitutes a modification of and an improvement in the bar feeder of applicants' copending application Ser. No. 600,350, filed Nov. 22, 1966. Both feeders employ the long steel box beam as a backbone for the feeder frame. This novel construction is particularly advantageous in bar feeders and provides a great deal of versatility in frame design. The box beam has such great rigidity that the frame for the bar feeder required support at only two spaced locations even when its length is 20 feet or more. The supports for the box beam are conveniently placed at least 10 feet apart, and the beam has sufficient rigidity to permit opposite ends of the beam to project substantial distances in cantilever fashion. This is important where it is desired to mount the frame on wheels for lateral movement or to conserve floor space. The box beam of the feeder frame can, for example, project in cantilever fashion as in FIGURES 1 and 2 and be unsupported for lengths many times the vertical height of the box beam, (in some instances 20 or more times such vertical height).

While the drawings have been drawn to scale to facilitate an understanding of the invention, it will be understood that the size and arrangement of the parts may vary considerably.

It will be understood that the above description is by way of illustration rather than limitation and that, in accordance with the provisions of the patent statutes, variations and modifications of the specific methods and devices disclosed herein may be made without departing from the spirit of the invention.

Having described our invention, we claim:

1. A feeder for heavy bars or tubes comprising a conveyor having bar-receiving carriers mounted thereon to support a bar in a feeding position, a feed rack having means for supporting a row of long bars in parallel relation at one side of said conveyor for feeding to said carriers, ramp means mounted for movement from a retracted position out of the path of movement of said carriers to an advanced operative position in such path wherein said ramp means serves to guide the bar nearest said conveyor from said row to a loading position adjacent said feeding position while supporting the bar, escapment means for effecting lateral movement of one bar from said row to said ramp means and for preventing advancing movement of the remaining bars of said row, whereby the bars are successively fed to said carriers, means for driving said conveyor while said ramp means is in said retracted position, and means engageable with said bar at said loading position to reduce the speed of movement of the bar and reduce the force of impact of said bar on said carriers when it moves from said loading position to said feeding position.

2. A bar and tube feeder as defined in claim 1 wherein means are provided for moving said last-named means transversely independently of said ramp means from a position out of the path of movement of said carriers to a position in said path.

3. A bar and tube feeder as defined in claim 1 wherein means are provided for advancing said last-named means against the bar at said loading position and thereafter retracting said last-named means to lower said bar onto said carriers.

4. A bar and tube feeder as defined in claim 1 wherein means are provided to cushion the impact of the bar with said last-named means as the bar moves to said loading position.

5. A bar and tube feeder as defined in claim 1 wherein said last-named means also engages the bottom portion of the bar to remove it from said carriers when it is returned to its initial feeding position after a machining operation.

6. A bar and tube feeder as defined in claim 5 wherein said last-named means comprises one or more ejector fingers mounted for movement vertically from a position below and out of the path of movement of said carriers to an ejecting position in engagement with the bottom portion of the bar, and means are provided for moving said ejector fingers to said ejecting position to lift the bar off of said carriers and to eject the bar laterally.

7. A bar and tube feeder as defined in claim 6 wherein an unloading ramp is provided on the side of the conveyor opposite said feed rack and said ejector fingers are shaped to support the bar and guide it onto said ramp after it is ejected from said carriers.

8. A bar and tube feeder as defined in claim 1 wherein said last-named means comprises a cushioning member mounted on the side of the conveyor opposite said feed rack, and pneumatic motor means are provided for moving said member laterally above said conveyor against the bar at said loading position and for slowly retracting said member to lower the bar onto said carriers.

9. A feeder as defined in claim 8 wherein said cushioning member has a pad of yieldable cushioning material for engaging the bar at said loading position.

10. A bar and tube feeder as defined in claim 1 wherein each of said carriers has laterally spaced rollers mounted thereon with an elastomeric cushioning material forming the outer surface of said rollers.

11. A bar and tube feeder as defined in claim 1 wherein a long pusher rod is provided on said conveyor rearwardly of said carriers for engaging the rear of each bar fed to said carriers from said escapement means, means mounting the rear portion of said pusher rod on said conveyor with the front portion projecting forwardly in cantilever fashion so that said front portion can extend forwardly a substantial distance beyond the front end of the conveyor when the pusher rod is in its advanced forward position, at least one carrier on said conveyor for supporting the front portion of said pusher rod during movement of the conveyor, and a stationary pusher support rigidly mounted in a fixed position forwardly of said conveyor and having a rotating sleeve coaxial with said pusher rod, bearing means rotatably mounting said sleeve for rotation on said pusher support, said sleeve having a central opening shaped to receive the front portion of said pusher rod and to support it for rotation about a horizontal axis.

12. A bar and tube feeder as defined in claim 1 wherein a pusher rod is provided on said conveyor rearwardly of said carriers for engaging the rear of each bar fed to said carriers from said escapement means, said pusher rod has an opening at its front end to receive the rear end of the bar on said carriers and means at said opening to grip the bar, wherein stop means are provided to force the bar a predetermined distance into said opening, and wherein stop means are provided to stop the advancing movement of said pusher rod at a predetermined position, whereby each bar is automatically and accurately positioned by said pusher rod for a machining operation.

13. A feeder as defined in claim 1 wherein said last-named means comprises a cushion member mounted to move laterally from a position at the side of the conveyor opposite said feed rack and out of the path of movement of said carriers to a position in said path to engage the bar before it leaves said ramp means and means for moving said cushion member laterally to engage the bar and gently lower it onto said carriers from said loading position.

14. A feeder for heavy bars or tubes comprising a conveyor having bar-receiving carriers mounted thereon to support a bar in a feeding position, a feed rack having means for supporting a row of bars at one side of said conveyor for feeding to said carriers, ramp means mounted for movement from a retracted position out of the path of movement of said carriers to an advanced operative position adjacent such path wherein said ramp means serves to guide the bar nearest said conveyor from said row to a loading position adjacent to said feeding position and at the end of said ramp means, escapement means for effecting lateral movement of one bar from said row to said ramp means and for preventing advancing movement of the remaining bars of said row, whereby the bars are successively fed to said carriers, means for driving said conveyor while said ramp means is in said retracted position, means for moving said ramp means to said advanced position while the conveyor is stationary to advance one bar to said loading position, and means engageable with said one bar at said loading position before the bar moves to said feeding position to reduce the speed of movement of the bar and reduce the force of impact of said bar on said carriers when it moves off of said ramp means to said feeding position on said carriers, said last-named means comprising a cushioning member mounted on the side of the conveyor opposite said feed rack and motor means for moving said member transversely above said conveyor to engage the bar at said loading position and for slowly retracting said member to lower the bar gently onto said carriers.

15. A bar and tube feeder as defined in claim 1 wherein said conveyor has sprockets rotatably mounted on the feeder frame and a chain mounted on said sprockets with on upper flight held in a horizontal position and supporting the carriers, each carrier having a pair of aligned axially spaced rollers mounted thereon to receive a cylindrical bar between them and to support the bar parallel to and midway between the axis of said rollers, each of said rollers being adjustably mounted on its associated carrier for lateral movement to a large number of different positions, and adjusting means for simultaneously moving the rollers of each pair equal distances toward and away from each other to accommodate bars of varying diameter while maintaining the axis of the bar equidistant from the axis of said rollers.

16. A feeder as defined in claim 15 wherein each of said rollers is formed of an elastomeric cushioning material.

References Cited

UNITED STATES PATENTS

| | | | |
|---|---|---|---|
| 1,901,360 | 3/1933 | Snow | 214—340 XR |
| 2,540,994 | 2/1951 | Rogers | 214—339 XR |
| 2,601,494 | 6/1952 | Baule | 214—1.2 |
| 2,751,781 | 6/1956 | McConnell. | |

FOREIGN PATENTS 731,945  6/1955  Great Britain.

GERALD M. FORLENZA, Primary Examiner

FRANK E. WERNER, Assistant Examiner

U.S. Cl. X.R.

82—2.7; 198—183; 214—1